United States Patent
Salzgeber et al.

(10) Patent No.: US 10,494,995 B2
(45) Date of Patent: Dec. 3, 2019

(54) RECIPROCATING PISTON ENGINE, IN PARTICULAR INTERNAL COMBUSTION ENGINE

(71) Applicant: AVL LIST GMBH, Graz (AT)

(72) Inventors: Kurt Salzgeber, Lassnitzhoehe (AT); Mario Theissl, Schwanberg (AT)

(73) Assignee: AVL LIST GMBH, Graz (AT)

( * ) Notice: Subject to any disclaimer, the term of this patent is extended or adjusted under 35 U.S.C. 154(b) by 75 days.

(21) Appl. No.: 15/751,783

(22) PCT Filed: Aug. 10, 2016

(86) PCT No.: PCT/EP2016/069093
§ 371 (c)(1),
(2) Date: Feb. 9, 2018

(87) PCT Pub. No.: WO2017/025580
PCT Pub. Date: Feb. 16, 2017

(65) Prior Publication Data
US 2018/0238228 A1    Aug. 23, 2018

(30) Foreign Application Priority Data

Aug. 10, 2015 (AT) ............... A 50713/2015
Dec. 14, 2015 (AT) ............... A 51062/2015

(51) Int. Cl.
*F02B 75/04* (2006.01)
*F16C 7/06* (2006.01)
(Continued)

(52) U.S. Cl.
CPC ........... *F02B 75/045* (2013.01); *F02D 15/02* (2013.01); *F16C 7/04* (2013.01); *F16C 7/06* (2013.01);
(Continued)

(58) Field of Classification Search
USPC ............................................. 123/48 B, 78 E
See application file for complete search history.

(56) References Cited

U.S. PATENT DOCUMENTS 2,217,721 A   10/1940  Anthony
2,989,954 A    6/1961  Hulbert
(Continued)

FOREIGN PATENT DOCUMENTS

AT     514071     10/2014
DE    4026492      2/1992
(Continued)

OTHER PUBLICATIONS

Official Action for Austria Patent Application No. A 50713/2015, dated Jul. 14, 2016, 3 pages.
(Continued)

*Primary Examiner* — Long T Tran
*Assistant Examiner* — James J Kim
(74) *Attorney, Agent, or Firm* — Sheridan Ross P.C.

(57) ABSTRACT

The invention relates to a reciprocating piston engine, in particular an internal combustion engine, comprising at least one length adjustable connecting rod (1) connected to a crankshaft (26), which connecting rod (1) comprises at least one first rod part (2) having a small connecting-rod eye (3) and at least one second rod part (4) having a large connecting-rod eye (5), which two rod parts (2, 4) can be displaced telescopically with respect to and/or into each other by means of a length adjustment device (100), wherein the length adjustment device (100) can be fluidically connected in at least one position of a control valve (15) to at least one oil pressure line (14, 6), and can be separated from the oil pressure line (16) in at least one second position of the control valve (15), wherein the control valve (15) can be electrically switched and inductively actuated. In order to
(Continued)

allow the compression ratio to be flexibly changed in a way that is as simple, space-saving and reliable as possible, the control valve (15) can be electrically connected to at least one induction device (21) fixed to the connecting rod, in which an electrical current can be induced in at least one position of the connecting rod (1) by means of at least one magnet device (24) fixed to the crank housing or crankshaft.

29 Claims, 6 Drawing Sheets (51) Int. Cl.
  *F16C 7/04* (2006.01)
  *F02D 15/02* (2006.01)
  *F16K 31/00* (2006.01)

(52) U.S. Cl.
  CPC ........ *F16K 31/004* (2013.01); *F16C 2360/22* (2013.01)

(56) References Cited

U.S. PATENT DOCUMENTS

| | | | | |
|---|---|---|---|---|
| 9,828,909 | B2* | 11/2017 | Paul | F02B 75/045 |
| 9,964,031 | B2* | 5/2018 | Balling | F16K 27/041 |
| 10,294,859 | B2* | 5/2019 | Melde-Tuczai | F02B 75/045 |
| 2015/0152794 | A1* | 6/2015 | Paul | F02D 15/02 |
| | | | | 123/48 R |

FOREIGN PATENT DOCUMENTS

| | | |
|---|---|---|
| DE | 4315463 | 5/1994 |
| DE | 19757871 | 7/1999 |
| DE | 19858245 | 6/2000 |
| DE | 10201601 | 6/2003 |
| DE | 10230427 | 1/2004 |
| DE | 102005055199 | 5/2007 |
| DE | 102007040699 | 3/2009 |
| DE | 102013111617 | 4/2015 |
| EP | 0438121 | 7/1991 |
| JP | 2005-267420 | 9/2005 |
| JP | 2010-112286 | 5/2010 |
| WO | WO 2015/055582 | 4/2015 |

OTHER PUBLICATIONS

Official Action for Austria Patent Application No. A 51062/2015, dated Nov. 7, 2016, 3 pages.
Official Action for Austria Patent Application No. A 51062/2015, dated Jul. 26, 2017, 2 pages.
Decision to Grant for Austria Patent Application No. A 51062/2015, dated Oct. 19, 2017, 2 pages.
Official Action for Austria Patent Application No. A 50390/2016, dated Dec. 7, 2016, 3 pages.
Search Report for Austria Patent Application No. GM 8003/2017, dated Feb. 21, 2017, 3 pages.
International Search Report prepared by the European Patent Office dated Oct. 20, 2016, for International Application No. PCT/CN2016/069093.
English Translation of International Preliminary Report on Patentability for International (PCT) Patent Application No. PCT/EP2016/069093, dated Feb. 22, 2018, 8 pages.

* cited by examiner

RECIPROCATING PISTON ENGINE, IN PARTICULAR INTERNAL COMBUSTION ENGINE

CROSS REFERENCE TO RELATED APPLICATIONS

This application is a national stage application under 35 U.S.C. 371 and claims the benefit of PCT Application No. PCT/EP2016/069093 having an international filing date of 10 Aug. 2016, which designated the United States, which PCT application claimed the benefit of Austria Patent Application No. A50713/2015 filed 10 Aug. 2015 and Austria Patent Application No. A51062/2015 filed 14 Dec. 2015, the disclosure of each of which are incorporated herein by reference.

The invention relates to a reciprocating piston engine, in particular an internal combustion engine, comprising at least one length-adjustable connecting rod which has at least one first rod part with a small connecting rod eye and at least one second rod part with a large connecting rod eye, the two rod parts being telescopically displaceable with respect to and/or into each other by means of a length adjustment device, wherein the length adjustment device can be fluidically connected to at least one oil duct in at least one position of a control valve and can be separated from the oil duct in at least one second position of the control valve, wherein the control valve can be electrically switched and inductively actuated.

Printed publication U.S. Pat. No. 2,217,721 A discloses an internal combustion engine with a length-adjustable connecting rod having a first and a second rod part, said rod parts being telescopically displaceable with respect to and/or into each other. A high pressure chamber into which an oil duct flows stretches between the two rod parts. To refill and drain the high pressure chamber of oil and thus adjust the length of the connecting rod, a control valve having an axially displaceable closure piece element is provided which can be moved into a first closed position by a return spring and into a second open position by oil pressure acting against the force of the return spring.

A length-adjustable connecting rod is known from AT 514 071 B1, whereby in one embodiment, the control valve comprises a control piston which is electromagnetically actuated by an induction coil arranged in the crankcase.

Further inductively-actuated length-adjustable connecting rods are known from the DE 10 2007 040 699 A1, DE 102 30 427 A1, DE 198 58 245 A1 and DE 197 57 871 A1 publications.

The task of the invention is that of providing an improved reciprocating piston engine, a particular task is enabling the flexible changing of the compression ratio of the reciprocating piston engine and/or individual cylinders of same in as simple, space-saving and reliable of a manner as possible.

According to the invention, this is achieved in a first aspect of the invention by the control valve of a reciprocating piston engine being connectable or connected to at least one induction device fixed to the connecting rod in which an electrical current can be induced in at least one position of the connecting rod by means of at least one magnet device which is—preferably—fixed to the crankcase or crankshaft. This thereby enables quickly and easily changing the compression ratio, allows long-term and highly wear-resistant operation and provides good resistance to engine operating conditions. In particular, the invention allows operating point-independent active switching of the compression ratio, which enables emission and consumption advantages to be realized.

In one variant of the invention, the induction device comprises at least one inductance loop, whereby the inductance loop is preferably formed by at least one conductive path printed on the connecting rod. This enables extremely compact construction and simple manufacturing. Signs of wear can thereby be minimized or fail-safety increased. It is in particular possible for the induction device to be arranged on least at a front side of the connecting rod and/or on a side surface of a bearing cap of the connecting rod. The induction device thereby ideally extends at least partly, preferentially halfway, around the circumference of the large connecting rod eye. The upper or the lower circumference half can thereby be provided with the induction device in the mounting position.

A further embodiment of the invention provides for the magnet device to comprise pole segments of different magnetic polarity which are preferably arranged as a magnetic ring of multiple consecutive pole segments of different magnetic polarity. Current can thereby be permanently induced in the induction device. Thus, the induction device can provide current for switching the control valve independently of the crank angle.

Preferably, the magnet device is arranged on or in at least one crank arm of the crankshaft. The electromagnetic excitation is thus induced by the segmented magnetization of the crank arm elements facing the connecting rod side surfaces. Alternatively thereto, it can also be provided for the magnet device to be arranged in a crankcase or in an oil pan.

Further advantages of the invention can be obtained when the magnet device comprises at least one permanent magnet.

In order to switch the control valve, at least one electrical switching apparatus is preferably arranged in the current flow between the induction device and the control valve. It is particularly advantageous for the electrical switching apparatus to be actuatable by a signal receiver preferably fixed to the connecting rod which communicates with a signal transmitter preferably fixed to the casing—for example an antenna. For the non-contact signal transmission of the control signal for the electrical switching apparatus, both analog electrical or magnetic fields in the form of proximity sensors as well as digitally processed electromagnetic signal bursts in the form of a telemetric signal transmission unit can be used.

One embodiment of the invention provides for the magnet device to be of switchable design. Thus, variants can be realized which function without electrical switching apparatus in the connecting rod, signal receivers or switching transmitters for the non-contact signal transmission of a control signal.

It is thereby preferably provided for the magnet device to comprise at least one stator coil, wherein preferably the coil current of the stator coil is switchable. Switching the coil current controls the magnetic field and thus the voltage induced in the inductance loops of the connecting rod. The activation and/or deactivation of the control valve thus ensues directly from switching the coil current of the stator coil on and off.

Alternatively thereto—or additionally—it can be provided for the magnet device to be position-adjustable, wherein the magnet device is preferably mounted displaceable or pivotable in a crankcase or in an oil pan. Adjusting the position of the magnet device alters the distance between the permanent magnets/stator coils disposed in the crankcase or oil pan and the inductance loops fixed to the connecting rods and thus controls the voltage induced in the inductance loops.

The control valve preferably designed as a switch valve can be formed for example by a piezo valve or a magnetic valve, in particular a 3/2-way valve. Here, 3/2-way valve means that the valve has three ports and two switching positions, whereby in each of the two switching positions, two ports are connected together.

In one variant of the invention, the second rod part of the connecting rod forms a guide cylinder and the first rod part forms a piston element longitudinally displaceable in the guide cylinder, wherein a high pressure chamber is spanned on at least one side of the piston element between the second rod part and the piston element. Preferentially, a first high pressure chamber is formed on the side facing the large connecting rod eye, a circular second high pressure chamber on the sides of the small connecting rod eye.

It can be further provided within the scope of the invention for at least one high pressure chamber to be connected to a switchable labyrinth seal. The magnitude of the second high pressure chamber leakage can be changed by means of the switchable labyrinth seal.

One advantage of the invention over known electrically controlled length-adjustable connecting rods is being able to dispense with an electrically insulated conductor in the dividing plane area between the connecting rod and connecting rod bearing cap.

In a further embodiment of the reciprocating piston engine, same has two induction devices, each with at least one generator coil, wherein generator coils of different induction devices are arranged adjacently in relation to a direction of rotation of the connecting rod. The providing of two induction devices enables two coils of an electromagnetic control valve to be separately switched without a switch needing to be provided in the connecting rod.

In a further embodiment of the reciprocating piston engine, different generator coils of the same induction devices are arranged one behind the other in relation to a direction of rotation of the connecting rod. When the generator coils are arranged in a row, they can all interact with a magnet device corresponding approximately to the width of the generator coils. The transmitted power can thereby be increased while the space requirements remain the same.

In a further embodiment of the reciprocating piston engine, the generator coils each comprise two pole arms each having a respective pole, whereby the poles are aligned at least substantially outwardly in relation to the connecting rod, in particular in at least substantially radial direction in relation to an axis of rotation of the connecting rod.

Preferably, the poles are thereby aligned approximately parallel. Further preferably, the cores of the generator coils, which in particular form the pole arms and the poles, are constructed as laminated cores. Same is preferably fixed to the connecting rod cap by welding, crimping, bolting, cementing etc.

In a further embodiment of the reciprocating piston engine, the poles of a generator coil are arranged one behind the other in relation to the rotational direction of the connecting rod and/or poles of different induction devices are arranged offset by half a pole. Both arrangements are particularly space-saving. In particular, offsetting the poles can make optimal use of the space available for the windings of the generator coils.

In a further embodiment of the reciprocating piston engine, the magnet device is displaceable toward an axis of rotation of the connecting rod or a crankshaft axis respectively. The coils of the control valve can be switched by the displacing of this magnet device.

In a further embodiment, the reciprocating piston engine comprises two magnet devices, wherein one magnet device is in each case arranged opposite one of the two induction devices and preferably comprises at least one stator coil. This enables particularly simple switching of the control valve coils by means of the power supply of the magnet devices.

In a further embodiment of the reciprocating piston engine, the magnet device or the magnet devices exhibit(s) the form of at least one section of a figure-eight path of the connecting rod. This thereby ensures the most efficient transfer of energy possible between the magnet device and induction device.

In a further embodiment of the reciprocating piston engine, each of the magnet device(s) comprise(s) one stator coil having a multi-phase winding configured to generate a multi-phase, in particular 2-phase or 3-phase rotating field. Varying the rotational speed/frequency of the rotating field varies the transfer of energy between the magnet device and induction device, thus controlling the function of the control valve.

In a further embodiment, the reciprocating piston engine comprises a control means arranged to generate the rotating field in opposite direction to the movement of the connecting rod.

In a further embodiment of the reciprocating piston engine, the control means is further arranged to set a rotational speed of the rotating field subject to the rotational speed of a crankshaft, wherein preferably a relative rotational speed of from approximately 20,000 to approximately 40,000 rpm, preferentially approximately 30,000 rpm, is set between the rotating field and crankshaft.

The features of individual embodiments can be freely combined provided doing so is not expressly excluded. The features and advantages of the first aspect of the invention thereby apply to the second aspect of the invention, as explained in the following, and vice versa.

A second aspect of the invention relates to a method for operating a reciprocating piston engine, wherein the rotating field is generated in opposite direction to the movement of the connecting rod.

In one embodiment of the method, a rotational speed of the rotating field is set subject to the rotational speed of a crankshaft, wherein preferably a relative rotational speed of from approximately 20,000 to approximately 40,000 rpm, preferentially approximately 30,000 rpm, is set between the rotating field and crankshaft.

In a further embodiment of the method, a coil current of a stator coil (31) is changed so as to equalize a change in an induced energy due to a change in speed of a crankshaft.

The invention will be described in greater detail in the following on the basis of a non-limiting example embodiment as depicted in the figures. Shown therein schematically.

Functionally equivalent parts in the embodiments are provided with the same reference numerals.

Figure 1:
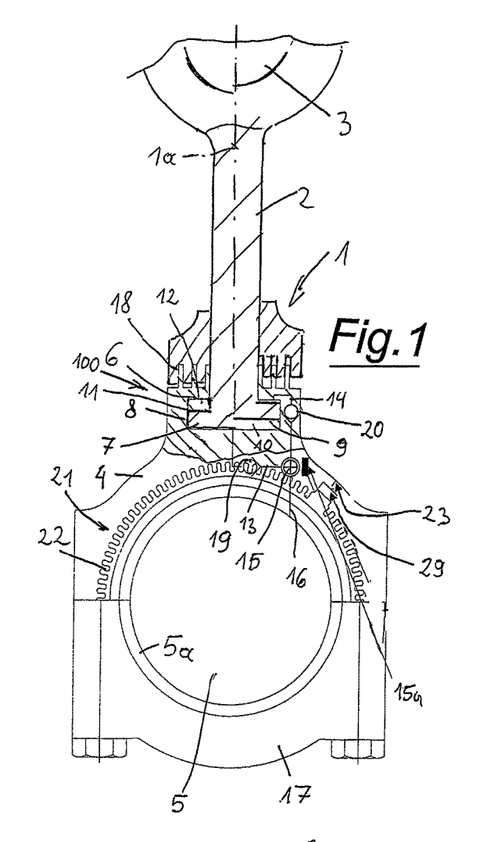
FIG. 1 a first embodiment of a connecting rod of an internal combustion engine according to the invention in longitudinal section, FIG. 2 a detail of the connecting rod in one implementation of said first inventive embodiment, FIG. 3 a crank throw including connecting rod in a longitudinal section through the crankshaft, FIG. 4 a detail of the connecting rod including magnet device in a second implementation of the first embodiment, FIG. 5 a second embodiment of a connecting rod of an internal combustion engine according to the invention, FIG. 6 a third embodiment of a connecting rod of an internal combustion engine according to the invention, FIG. 7 a fourth embodiment of a connecting rod of an internal combustion engine according to the invention with deactivated magnet device, FIG. 8 said connecting rod with activated magnet device, FIG. 9 an enlarged view of a bearing cap having two induction devices, FIG. 10 an arrangement of two magnet devices in relation to two induction devices on a bearing cap.
Figure 2:
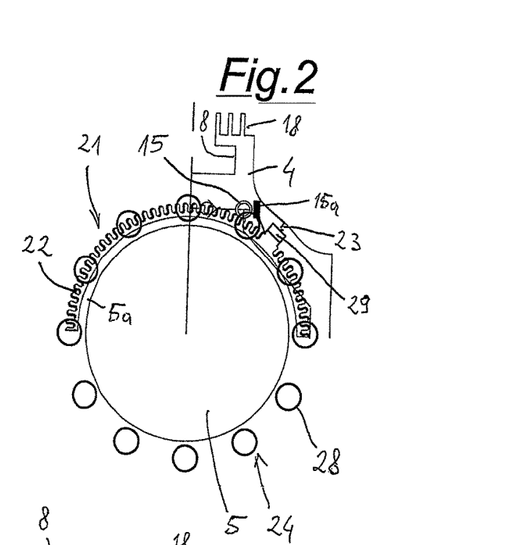
Figure 3:
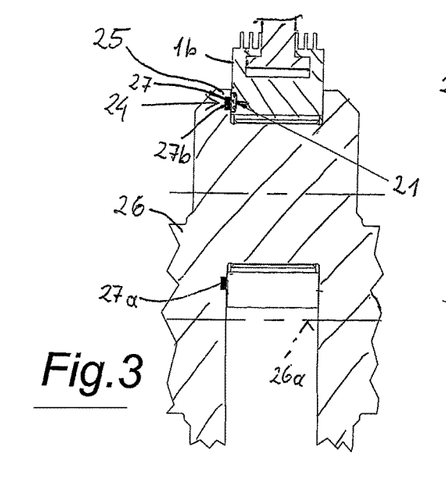

FIG. 1 shows a two-part connecting rod 1 of a reciprocating piston engine, in particular an internal combustion engine, having an upper first rod part 2 with the small connecting rod eye 3 for connecting to a not shown piston and a lower second rod part 4 with the large connecting rod eye 5 forming a connecting rod bearing 5*a* for connecting to a crankshaft 26. The first rod part 2 is displaceable vis-à-vis the second rod part 4 between an extended position and an inserted position. A—preferably pressurized oil-operated—length adjustment device 100 as depicted schematically in FIGS. 5 to 8 is provided for the longitudinal adjustment. The length adjustment device 100 can be for example a variant as depicted in FIGS. 1 to 4. Other variants able to provide an oil-controllable longitudinal adjustment are also possible. Since this aspect relates to a peripheral scope of the invention, the following will only describe one possible variant, wherein the use of a different solution is expressly not excluded.

The connecting rod 1 is shown in FIG. 1 divided along the longitudinal axis 1*a* of the connecting rod 1, wherein it is depicted in its first position of shorter piston rod length and lowered first rod part 2 on the left and in its second position of longer piston rod length and raised second rod part 4 on the right.

A control valve 15 connected to the connecting rod bearing 5*a* by an oil pressure line 16 is arranged between the length adjustment device 100, which is preferentially arranged in the center region of the connecting rod 1, and the connecting rod bearing 5*a* of the large connecting rod eye 5. An oil-pressurizable connection likewise exists between the control valve 15 and the length adjustment device 100.

To actuate the control valve 15, the connecting rod 1 inventively comprises an induction device 21 which can be electrically connected to a coil 15*a* of the control valve 15 by an electrical switching apparatus 23. The electrical switching apparatus 23 is arranged in the electrical connection between the inductance loop 22 and the control valve 15.

According to the first embodiment of the invention, the induction device 21 has at least one inductance loop 22 which in the depicted implementation is formed by at least one conductive path printed on the connecting rod 1 which exhibits a plurality of consecutive induction loops. The induction loop 22 is for example arranged on at least one front side 1*b* of the connecting rod 1 in the region of the large connecting rod eye 5. However, it can also alternatively or additionally be provided on a side of a bearing cap 17 of the connecting rod bearing 5*a*. The induction loop 22 ideally extends over at least half the circumference of the large connecting rod eye 5 on the front side 1*b*. This can thereby be either the upper or the lower circumference half.

The induction device 21 moreover comprises a magnet device 24 arranged on a part adjacent the connecting rod 1. In the example embodiments, the magnet device 24 is arranged on or in a crank arm 25 of the crankshaft 26 adjacent the front side 1*b* of the connecting rod 1 or the bearing cap 17 respectively. The magnet device 24 thereby faces the inductance loop 22.

Figure 4:
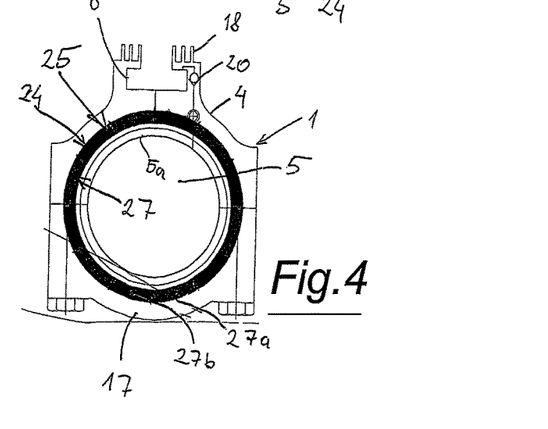

The magnet device 24 can be configured as a magnetic ring 27 having a plurality of consecutive pole segments 27*a*, 27*b* of different magnetic polarity (see FIG. 4). Alternatively or additionally thereto, the magnetic ring 27 can exhibit individual e.g. cylindrical permanent magnets 28 which are for example arranged in axial bores of the crank arm 25 (axial here means oriented along the longitudinal axis 26*a* of the crankshaft 26; i.e. normal to the drawing plane of the paper). The position of the individual permanent magnets 28 in the crank arm 25 of the crankshaft 26 is schematically implied in FIG. 2 as an example. Permanent magnets 28 are for example suitable in cases of increased power demand.

During the relative movement of the connecting rod 1 and the crank arm 25, the magnet device 24 sweeps the inductance loops 22 with alternating polarity. A voltage is thus induced in the printed inductance loops 22 as long as the crankshaft 26 rotates. The electrical power generated can be used to continuously operate an electrical circuit able to energize the electrical switching apparatus 23 via a non-contact transmitted signal, whereby the control valve 15 implemented as an electrical switch valve is activated or deactivated.

FIGS. 1 to 4 depict a concrete variant of the length adjustment device 100 in which the first 2 and second rod part 4 of the connecting rod 1 are displaceable in the direction of the longitudinal axis 1*a* of the connecting rod 1 about an adjustment area limited by an end stop 6. A substantially cylindrical piston element 7 implemented as a differential piston is fixed in the upper first rod part 2.

The first rod part 2 and the second rod part 4 of the connecting rod 1 are hydraulically coupled in the pressure direction and mechanically limited in the opposite direction. Pressure direction here means the direction in which the force of the combustion in the piston chamber acts on a not-shown piston.

The piston element 7 is displaceably guided axially (in the direction of the longitudinal axis 1*a* of the connecting rod 1) in a guide cylinder 8 of the lower second rod part 3 of the connecting rod 1, whereby in an extended state of the two rod parts 2, 3, a first high pressure chamber 10 stretches between a first face 9 of the piston element 7 facing the large connecting rod eye 5 and the second rod part 4 or the guide cylinder 8 respectively. Furthermore, in a collapsed state of the two rod parts 2, 3, a second high pressure chamber 12 stretches between a second face 11 of the piston element 7 facing the small connecting rod eye 3 and the second rod part 3. The second high pressure chamber 12 is thereby of substantially annular configuration.

The first high pressure chamber 10 and the second high pressure chamber 12 are connected via first or second oil ducts 13 or 14 to a control valve 15 implemented for example as a simple switch valve which optionally establishes the flow connection between an oil pressure line 16 from the connecting rod 5*a* and the first oil duct 13 or second oil duct 14. The connecting rod bearing 5*a* is connected to a not-shown oil supply line in the crankshaft 26. A respective check valve 19, 20 opening toward the high pressure chambers 10, 12 is in each case arranged between the control valve 15 of the first high pressure chamber 10 or second high pressure chamber 12 in the first oil duct 13 or second oil duct 14. The control valve 15 can be arranged in the connecting rod 1 or in the bearing cap 17 of the connecting rod bearing 5*a*.

The first high pressure chamber 10 and the second high pressure chamber 12 can be provided with—not shown to any greater detail—end position cushionings so as to minimize impacts and shocks during the switching of the connecting rod 1.

Activating the control valve 15 enables the flow connection between the oil pressure line 16 and one of the two oil ducts, for example first oil duct 13, and blocks the other oil duct, for example second oil duct 14. As a result, it takes for instance the extended length of the connecting rod 1 to achieve a high compression ratio when the first high pressure chamber 10 is filled with oil. The filling is supported by inertial force when the connecting rod 1 is in operation.

When deactivated, the flow connection between the oil pressure line 16 and the one oil duct, for example first oil duct 13, is blocked and the other oil duct, for example second oil duct 14, enabled. It thus takes for instance the shortened length of the connecting rod 1 to achieve a low compression ratio in the combustion chamber. This ensues by the second high pressure chamber 12 filling with oil or respectively the first high pressure chamber 10 being drained (for example by not-shown lines and/or in combination with the switch valve 15).

The control valve 15 thus alternatingly switches the oil pressure supply between the two high pressure chambers 10, 12, whereby there is only comparatively low electrical power requirement.

The electrical switching apparatus 23 is connected to a signal receiver 29 arranged for example in the connecting rod 1 and thus activated by a wirelessly transmitted signal. The signal receiver 29 communicates with a signal transmitter (antenna), not depicted in the figures, arranged for example in the crankcase. Both analog electrical or magnetic fields in the form of proximity sensors as well as digitally processed electromagnetic signal bursts in the form of a telemetric signal transmission unit can be used for the non-contact signal transmission of the control signal for the electrical switching apparatus 23.

As can be seen from FIG. 1, an adjustable or switchable seal, configured here as a labyrinth seal 18, is connected to the second high pressure chamber 12. The upper first rod part 2 and the lower second rod part 4 thereby engage with one another via the adjustable labyrinth seal 18.

The lower first high pressure chamber 10 is filled with oil via the first oil duct 13 in which the first check valve 19 opening toward the first high pressure chamber 10 is arranged. The upper second high pressure chamber 12 is filled with oil via a second oil duct 14 having a second check valve 20 opening toward said second high pressure chamber 12.

The control valve 15 from which the first oil duct 13 and the second oil duct 14 run can be formed for example as an electrically actuated 3/2-way valve. Implementations as a piezo valve or magnetic valve are also possible.

Should the connecting rod 1 adopt a first position of e.g. short rod length, the control valve 15 fills the upper second high pressure chamber 12 with oil. Leakages through the labyrinth seal 18 caused by the inertial force are directly compensated by replenishment from the second oil duct 14.

Should the connecting rod 1 be changed into a second position of e.g. long rod length, the control valve 15 switches. The first check valve 19 lets oil into the first high pressure chamber 10. The oil from the upper second high pressure chamber 12 is forced through the labyrinth seal 18—upward in FIG. 1—and partly also from the second high pressure chamber 12 past the piston element 7 into the lower first high pressure chamber 10.

When switched from the second position to the first position, oil passes the piston element 7 into the upper second high pressure chamber 12.

This solution allows very simple construction without complicated sealing or circuitry solutions. The labyrinth seal 18 has a relatively long sealing length, which retards leakages or respectively promotes the flow of oil via other routes (for example from the second high pressure chamber 12 into the first high pressure chamber 10). The length adjustments of the connecting rod 1 can be achieved over just a few cycles.

Figures 5, 6:
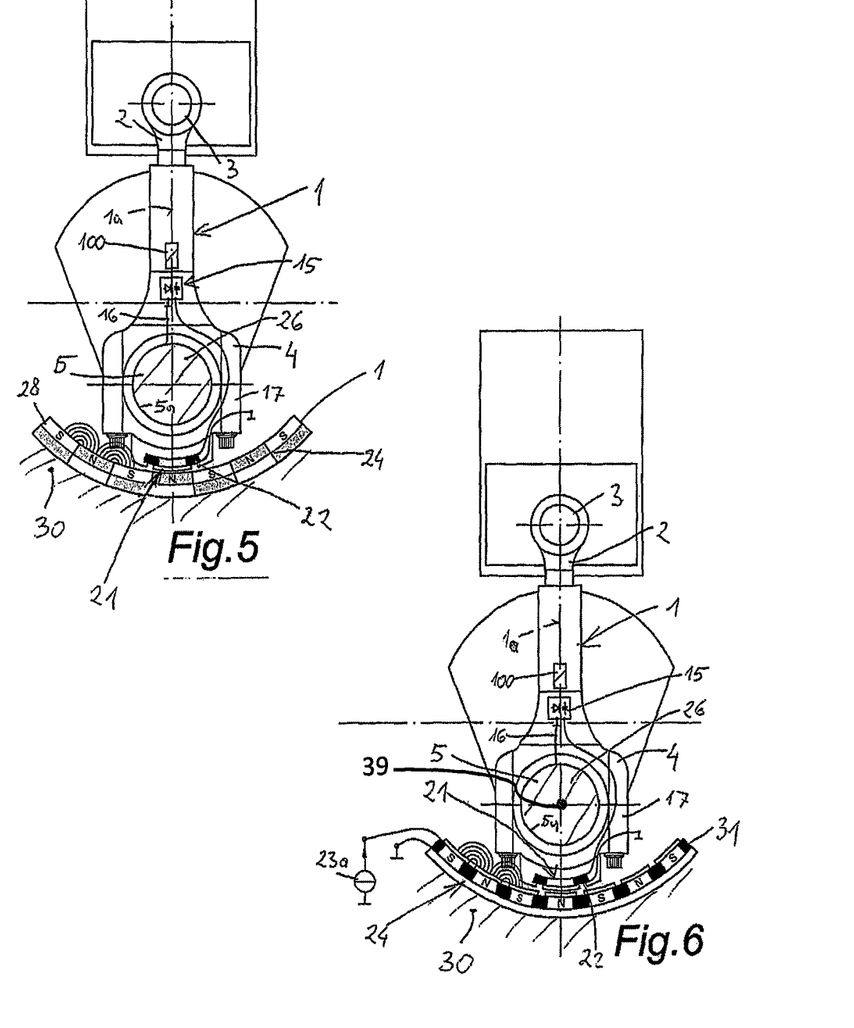

In the second embodiment depicted in FIG. 5, the magnet device 24 comprising permanent magnets 28 is fixedly connected to a crankcase 30. One or more inductance loops are arranged on the connecting rod 1, for example in the bearing cap 17 of the connecting rod bearing 5a. As in the first embodiment, a voltage is induced in the inductance loops 22 as soon as and for as long as the crankshaft 26 rotates. This generated electrical power can also be used here to continuously operate an electrical circuit—not shown in FIG. 5—which is capable of energizing an electrical switch via non-contact transmitted signal, whereby the electrically switchable electrical control valve 15 is activated or deactivated. This electrical switch is actuated as described by a signal receiver which wirelessly communicates with a signal transmitter arranged in the crankcase 30. The control valve 15 can be activated as described to fill/drain high pressure chambers 10, 12 when the length adjustment device 100 is realized in accordance with the example embodiment depicted in FIGS. 1 to 4. As the schematic depiction of the length adjustment device 100 in FIGS. 5 to 8 shows, same can also be realized in other ways.

In the third implementation depicted in FIG. 6, the switchable magnet device 24 fixedly connected to the crankcase 30 or an oil pan exhibits at least one stator coil 31, the coil current of which and thus the magnetic field of the induction device 21 can be changed by an electrical switching apparatus 23a disposed external of the connecting rod 1. The induction device 21 can thus be activated/deactivated by switching the coil current of the stator coil 31 on and off. The elements of the electrical switching apparatus 23 and signal receiver 29 in the connecting rod 1 as well as the switching transmitter in the crankcase 30 can thus be omitted since the switching of the control valve 15 ensues directly via the stator coil 31. A reset position of the control valve 15 defined by a—not shown in any greater detail—return spring of the control valve 15 is thereby associated with the de-energized state and an operational position of the control valve 15 associated with the energized state of the stator coil 31. This enables a simple way to provide a fail-safe function.

Figures 7, 8:
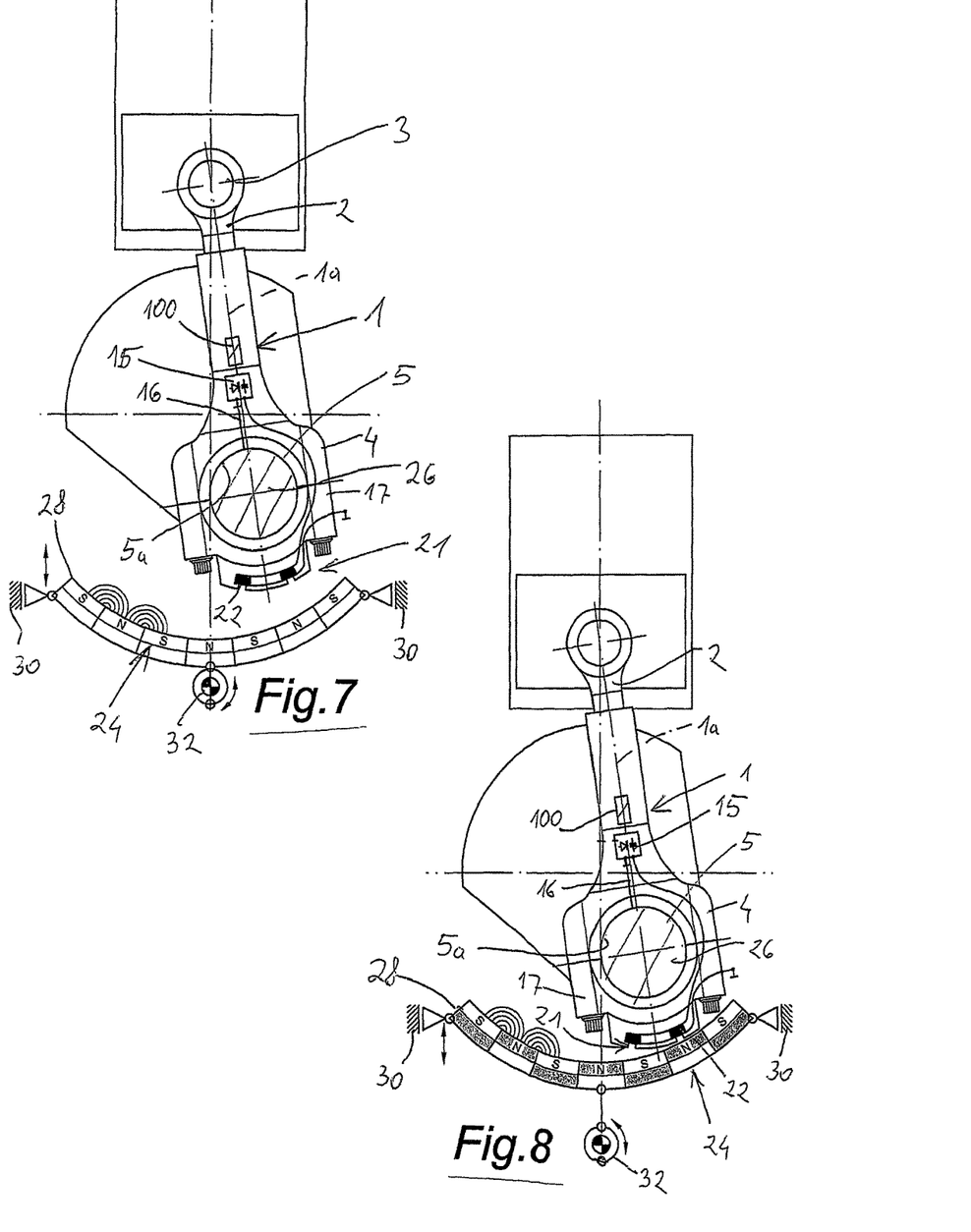

FIGS. 7 and 8 show a fourth implementation, wherein the magnet device 24—similar to as in FIG. 5—is formed by permanent magnets 28, although the magnet device 24 here is of switchable design. In contrast to FIG. 6, however, the switching function of the magnet device 24 is achieved here by the magnet device 24 being displaceably or pivotably mounted in the crankcase 30. By the displacing or pivoting motion of the magnet device 24 via an actuating device 32, the minimum distance between the induction loops 22 fixed to the connecting rod and the permanent magnets 28 can be increased or reduced and thus the magnetic field acting on the inductance loops changed. Activating and/or deactivating the induction device 21 thus ensues in simple manner via the actuating device displacing or pivoting the permanent magnets 28.

Here as well, no further electrical elements such as electrical switch, signal receiver or signal transmitter are needed. As can be seen in FIG. 7, the magnet device 24 is far enough away from the connecting rod 1 when the induction device 21 is deactivated that voltage can no longer be induced in the induction loops 22 of the connecting rod 1, whereby the control valve 15 adopts its de-energized reset position. When the induction device 21 is activated, the minimum distance between the connecting rod 1 and magnet device 24 is shortened enough that a voltage is induced into the inductance loops 22 and the control valve 15 thus switched into its operational position (FIG. 8).

Figure 9:
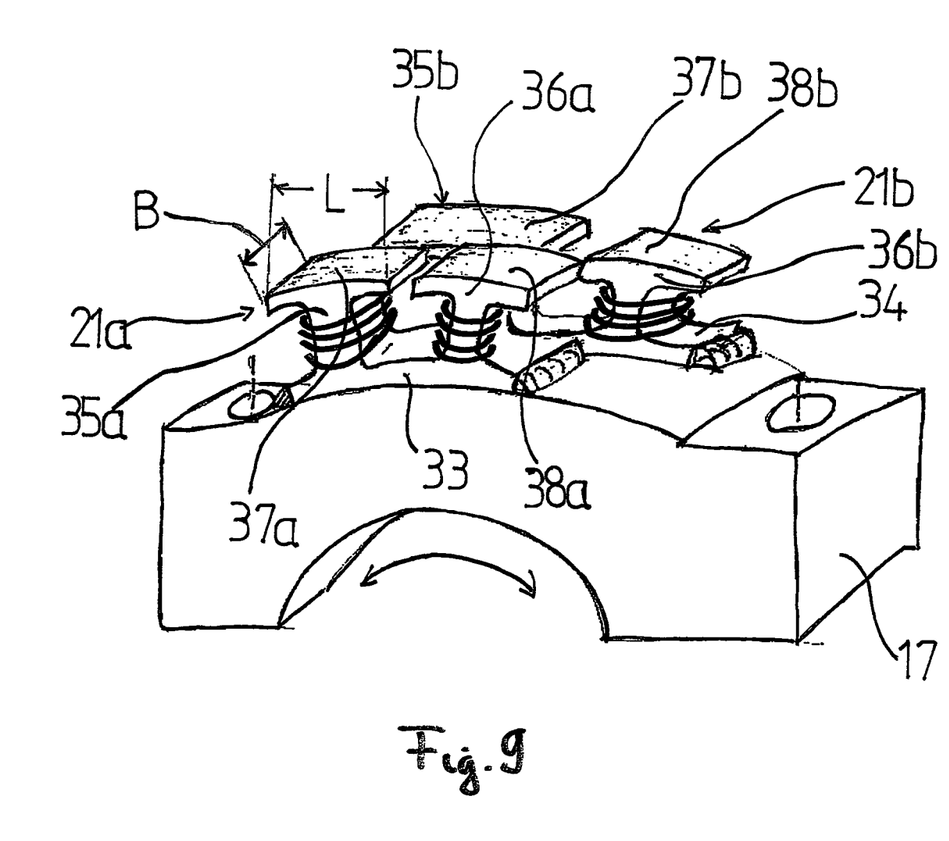

FIG. 9 shows a bearing cap 17 with two induction devices 21a, 21b. A first induction device 21a thereby exhibits at least one first generator coil 33 which is preferably configured as a salient pole generator. The coil core is thereby of U-shaped design with two arms 35a, 36a which form the two poles 37a, 38a of the first generator coil 33. The windings of the coil are divided among the two arms 35a, 36a in the depicted implementation.

The second induction device 21b also comprises a second generator coil 34 which is likewise U-shaped and has two arms 35b, 36b ending as two flat poles 37b, 38b of the second generator coil 34.

Figure 10:
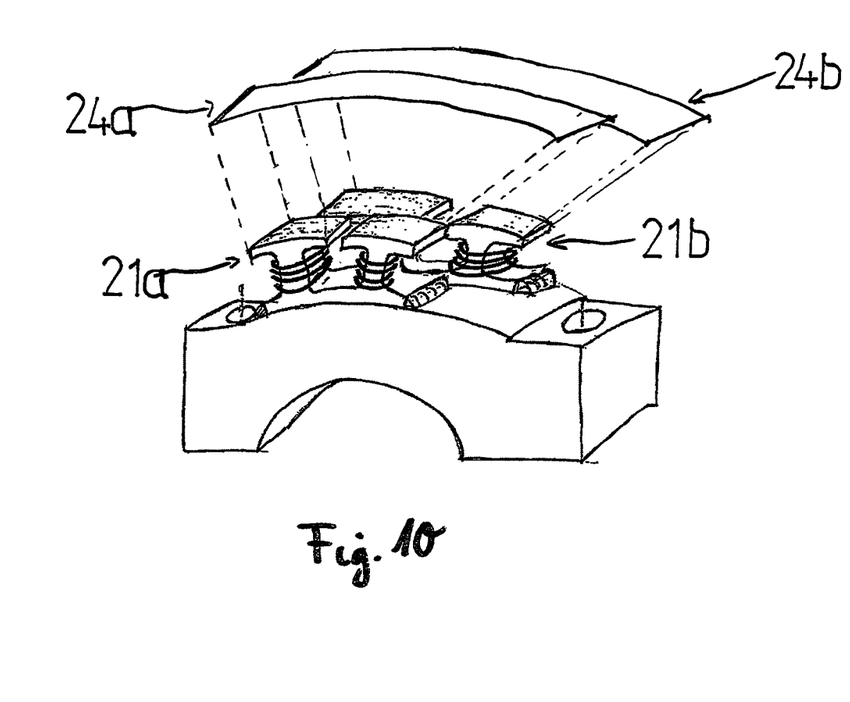

The poles 35a, 36a; 35b, 36b of each generator coil 33, 34 are arranged one behind the other in relation to the direction of rotation of the connecting rod, as suggested by the double-arrow in the detail of the connecting rod, as well as the connecting rod 1. Further generator coil poles of an induction device 21a, 21b are likewise arranged one behind the other in relation to the rotational direction such that the poles of each induction device 21a, 21b are arranged in a row. The respective pole surfaces of the induction devices 21a, 21b are thereby preferably slightly rounded and correspond to an enveloping at the poles in for instance the form of the connecting rod figure-eight path and/or connecting rod movement as is to be expected in a region in which, as depicted in FIG. 10, a magnet device 24 or multiple magnet devices 24a, 24b of the reciprocating piston engine are arranged. Preferably, the geometry of the magnet devices 24a, 24b also corresponds to the form of the connecting rod figure-eight path in that area of the connecting rod 1 movement in which the magnet devices 24a, 24b are arranged.

The two induction devices 21a, 21b in particular serve to be able to separately control two coils of the control valve 15. Two coils 15a of a control valve 15 can thereby be supplied separately with current and/or voltage and thus a switching of a control valve 15 realized with two or three switching states.

Preferably, as FIG. 10 shows, two magnet devices 24a, 24b are provided, each arranged opposite the respectively associated induction device 21a, 21b. This enables different coils 15a of the control valve 15 to be supplied by means of one or more electrical switching apparatus 23a, as shown in FIG. 6, each activating or able to activate a respective one of the two magnet devices 24a, 24b.

Alternatively, a connecting rod 1 with two induction devices 21a, 21b can also be operated in switchable fashion by a single magnet device 24 when same can displace in at least one substantially axial direction of the crankshaft so that it can be brought into close proximity to both the first induction device 21a as well as close proximity to the second induction device 21b in order to induce a current/voltage in the respective induction device 21a, 21b.

In order to pivot and/or displace such a magnet device 24 toward the crankshaft, an actuating device 32 is preferably provided as is depicted with respect to the implementations of FIGS. 7 and 8. The alternating voltage induced on the generator coils 33, 34 of the first and second induction device 21a, 21b can advantageously be directly conducted to the coils 15a of the control valve via electrical lines without a rectification or any electrical switching element needing to be provided in the connecting rod 1.

Preferably, the coil current of a switchable stator coil 31 can be changed so as to offset a change in induced energy resulting from a change in the rotational speed of the crankshaft of a reciprocating piston engine.

Figure 11:
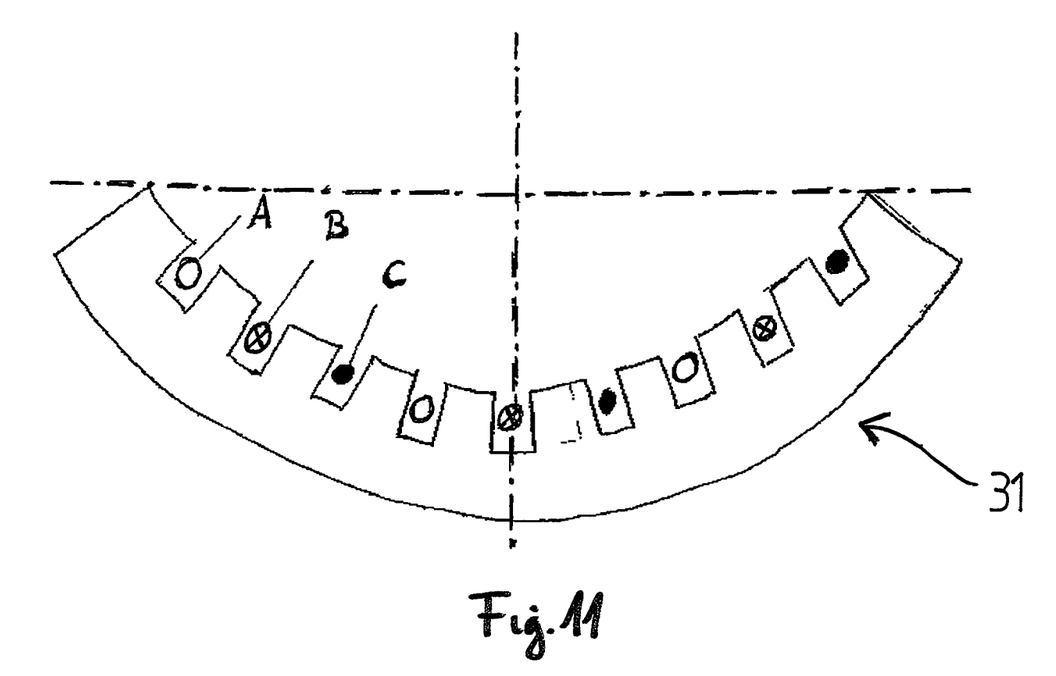
FIG. 11 a stator coil with a multi-phase winding.

Further preferably, the stator coils 31 of the magnet device 24 or magnet devices 24a, 24b are provided with multi-phase windings A, B, C, as is shown in FIG. 11.

The windings of the respective phase A (circular), B (crossover) and C (point) thereby alternate over the length of the stator coil. In particular, two, three or more phases can be provided.

By means of these phases of the stator coil 31, a rotating field, also called an alternating field or travelling field, can be generated. When such a rotating field acts on the stator coil 31 in opposite direction to the movement of the connecting rod, any relative rotational speed can be set between the connecting rod 1 and the magnet device 24 or static coil 31 respectively. In particular, it can be provided for the relative rotational speed to remain constant as the crankshaft speed changes in order to also keep the transfer of energy between the magnet device and the induction device constant. A high-frequency rotating field is therefore generated in the case of slow engine speeds or crankshaft speeds. As engine speed/crankshaft speed increases, the rotating field frequency is then reduced.

Preferably, a relative rotational speed of approximately 30,000 rpm is set, which corresponds approximately to a transmitted power of 7 W when the poles have an approximate length L of 8 mm and width B of 9 mm, as shown in FIG. 9, and the respective magnet device 24 exhibits dimensioning adapted to that effect. The relative rotational speed of a stator coil 31 with a multi-phase winding can be set in a controller (ECU) of the reciprocating piston engine via software and/or hardware (not depicted). Such a control means is in particular equipped to regulate the power electronics (not depicted) of the reciprocating piston engine for regulating the rotational speed of the rotating field as a function of the rotational speed of the crankshaft.

What is claimed is:

1. A reciprocating piston engine comprising a length-adjustable connecting rod connected to a crankshaft and comprising a first rod part with a small connecting rod eye and a second rod part with a large connecting rod eye, the two rod parts being displaceable with respect to and/or into each other by means of a length adjustment device, wherein the length adjustment device can be fluidly connected to a hydraulic medium line in at least one position of a control valve and can be separated from the hydraulic medium line in a second position of the control valve, wherein the control valve can be inductively actuated, wherein the control valve can be electrically connected to an induction device fixed to the connecting rod in which an electrical current and/or electrical voltage can be induced in at least one position of the connecting rod by means of a magnet device.

2. The reciprocating piston engine according to claim 1, wherein the induction device comprises at least one inductance loop, wherein the inductance loop is formed by at least one conductive path printed on the connecting rod.

3. The reciprocating piston engine according to claim 1, wherein the induction device is arranged on at least a front side of the connecting rod and/or on a side surface of a bearing cap of a connecting rod bearing of the connecting rod.

4. The reciprocating piston engine according to claim 1, wherein an electrical switching apparatus is arranged in a current flow between the induction device and the control valve.

5. The reciprocating piston engine according to claim 4, wherein the electrical switching apparatus is actuatable by a signal receiver fixed to the connecting rod which communicates with a signal transmitter fixed to the casing.

6. The reciprocating piston engine according to claim 1, wherein the magnet device comprises pole segments of different magnetic polarity which are arranged as a magnetic ring of multiple consecutive pole segments of different magnetic polarity.

7. The reciprocating piston engine according to claim 1, wherein the magnet device is arranged on or in at least one crank arm of the crankshaft.

8. The reciprocating piston engine according to claim 1, wherein the magnet device is arranged in a crankcase or in a hydraulic medium sump.

9. The reciprocating piston engine according to claim 1, wherein the magnet device comprises at least one permanent magnet.

10. The reciprocating piston engine according to claim 1, wherein the magnet device is of a switchable design.

11. The reciprocating piston engine according to claim 10, wherein the magnet device comprises at least one stator coil, wherein a coil current of the at least one stator coil is switchable.

12. The reciprocating piston engine according to claim 10, wherein the magnet device is position-adjustable, and wherein the magnet device is mounted displaceable or pivotable in a crankcase or in a hydraulic medium sump.

13. The reciprocating piston engine according to claim 1, wherein the control valve is formed by a piezo valve or a magnetic valve.

14. The reciprocating piston engine according to claim 1, wherein the second rod part forms a guide cylinder and the first rod part forms a piston element longitudinally displaceable in the guide cylinder, wherein a high pressure chamber is spanned on at least one side of the piston element between the second rod part and the piston element.

15. The reciprocating piston engine according to claim 1, wherein at least one high pressure chamber is connected to a switchable labyrinth seal.

16. The reciprocating piston engine according to claim 1, wherein the control valve is electrically switchable.

17. The reciprocating piston engine according to claim 1, which comprises two induction devices, each having at least one generator coil, wherein the generator coils of different induction devices are arranged adjacently in relation to a direction of rotation of the connecting rod.

18. The reciprocating piston engine according to claim 17, wherein different generator coils of the same induction devices are arranged one behind the other in relation to the direction of rotation of the connecting rod.

19. The reciprocating piston engine according to claim 17, wherein the generator coils each comprise two pole arms each having a respective pole, wherein the poles are aligned at least substantially outwardly in relation to the connecting rod, in a substantially radial direction in relation to an axis of rotation of the connecting rod.

20. The reciprocating piston engine according to claim 19, wherein the poles of the generator coil are arranged one behind the other in relation to the rotational direction of the connecting rod and/or poles of different induction devices are arranged offset by half a pole.

21. The reciprocating piston engine according to claim 1, wherein the magnet device is displaceable toward an axis of rotation of the connecting rod or a crankshaft axis respectively.

22. The reciprocating piston engine according to claim 17, comprising two magnet devices, wherein one magnet device is in each case arranged opposite one of the two induction devices and comprises at least one stator coil.

23. The reciprocating piston engine according to claim 1, wherein the magnet device exhibits a form of at least one section of a figure-eight path of the connecting rod.

24. The reciprocating piston engine according to claim 1, wherein the magnet device comprises at least one stator coil having a multi-phase winding configured to generate a multi-phase rotating field.

25. The reciprocating piston engine according to claim 24, further comprising a control means arranged to generate the rotating field in an opposite direction to a movement of the connecting rod.

26. The reciprocating piston engine according to claim 25, wherein the control means is further arranged to set a rotational speed of the rotating field subject to a rotational speed of a crankshaft, wherein a relative rotational speed of from approximately 20,000 to approximately 40,000 rpm, is set between the rotating field and crankshaft.

27. A method for operating the reciprocating piston engine according to claim 24, wherein the rotating field is generated in the opposite direction to the movement of the connecting rod.

28. The method according to claim 27, wherein a rotational speed of the rotating field is set subject to the rotational speed of a crankshaft, wherein a relative rotational speed of approximately 30,000 rpm is set between the rotating field and the crankshaft.

29. A method for operating the reciprocating piston engine according to claim 11, wherein the coil current of the stator coil is changed so as to equalize a change in an induced energy due to a change in a rotational speed of a crankshaft.

* * * * *